United States Patent [19]

Kano et al.

[11] 4,456,549

[45] Jun. 26, 1984

[54] PASTE FOR FORMATION OF TRANSPARENT ELECTROCONDUCTIVE COATING FILM AND PROCESS FOR PREPARATION OF SAID PASTE

[75] Inventors: Mitsuru Kano, Furukawa; Jun Nakanowatari, Miyagi; Yoshimi Kamijyo, Furukawa, all of Japan

[73] Assignee: Alps Electric Co., Ltd., Japan

[21] Appl. No.: 431,323

[22] Filed: Sep. 30, 1982

[30] Foreign Application Priority Data

Nov. 25, 1981 [JP] Japan ................................ 56-188886

[51] Int. Cl.³ ............................................. H01B 1/06
[52] U.S. Cl. .................................... 252/518; 106/186; 106/189; 106/195; 106/196; 106/197 R; 106/203; 106/287.18; 106/287.19
[58] Field of Search .......... 252/518; 106/1.05, 287.18, 106/195, 196, 197 R, 203, 287.19

[56] References Cited

U.S. PATENT DOCUMENTS 4,147,556 4/1979 Donley ........................ 106/287.18
4,268,539 5/1981 Nakayama et al. ................. 252/518
4,391,743 7/1983 Maeda et al. ....................... 252/518

Primary Examiner—Lorenzo B. Hayes
Attorney, Agent, or Firm—Guy W. Shoup; Henry T. Burke

[57] ABSTRACT

Disclosed is a paste for formation of a transparent electroconductive coating film, which comprises as a main component an organic indium complex having an oxygen atom coordinated directly to the indium atom, which is capable of forming an indium oxide film by sintering, such as trisacetylacetonatoindium (III).

This paste provides a coating film having a low resistivity and a high transparency by screen printing and sintering, and has a good stability and a long pot life.

If an organic tin compound such as tin octylate, dibutyl tin dilaurate or tetraacetylacetonatotin is incorporated as a resistivity-adjusting agent into this paste in an amount such that the Sn/(In+Sn) atomic ratio is 2 to 20%, especially good results are obtained. A cellulose derivative such as ethyl cellulose, nitrocellulose, acetyl cellulose or benzyl cellulose is advantageously incorporated as a viscosity builder into the paste.

12 Claims, 1 Drawing Figure

PASTE FOR FORMATION OF TRANSPARENT ELECTROCONDUCTIVE COATING FILM AND PROCESS FOR PREPARATION OF SAID PASTE

BACKGROUND OF THE INVENTION

(1) Field of the Invention

The present invention relates to a transparent electroconductive coating film-forming paste which is useful for forming any desired shape of a transparent electroconductive coating film composed of a metal oxide on a substrate such as glass by screen printing and sintering, and a process for the preparation of this paste.

(2) Description of the Prior Art

It is known that a coating film of an oxide of Cd, In or Sn formed on a glass or ceramic substrate is transparent and has good electroconductivity. This coating film is used for semiconductor elements, liquid crystal display devices or as a freeze preventing electroconductive film on window glass. The application ranges of these coating films are recently broadened. Such metal oxide type transparent electroconductive coating films have formed by a chemical spray methods, vacuum deposition methods and screen printing methods.

The chemical spray method is advantageous when a coating film having a relatively large area is desired, but when a coating film having a fine and complicated shape is desired, an additional step such as a photoetching step becomes necessary and the method is disadvantageous from the economical viewpoint. A mask vacuum deposition method has recently been developed which makes the photo-etching treatment unnecessary. However, since vacuum deposition of a large quantity of a metal oxide is impossible, this method is not suitable for mass production. The screen printing method is free from the foregoing disadvantages of chemical spray and vacuum deposition methods and is advantageous in that any desired shape of coating film can be formed by printing and sintering and the waste water treatment associated with the etching treatment need not be performed. However, the stability of transparent electroconductive coating film-forming pastes employed in the screen printing method is poor, the adaptability of the paste to the screen printing operation is bad, and the electroconductivity is not uniform in the formed coating films.

SUMMARY OF THE INVENTION

It is therefore a primary object of the present invention to provide a transparent electroconductive coating film-forming paste which can be formed into coating film having a low resistivity and high transparency while eliminating the foregoing defects of the conventional techniques and at the same time has high stability and long pot life.

Another object of the present invention is to provide a process for the preparation of the above-mentioned paste for formation of a transparent electroconductive coating film.

In accordance with one fundamental aspect of the present invention, there is provided a paste for formation of a transparent electroconductive coating film, which comprises as a main component an organic indium complex having an oxygen atom coordinated directly to the indium atom, which is capable of forming an indium oxide film with sintering. A typically useful product is trisacetylacetonatoindium (III).

In accordance with another fundamental aspect of the present invention, there is provided a process for the preparation of a paste for formation of a transparent electroconductive coating film, which coomprises the steps of adding an organic indidium complex having an oxygen atom coordinated directly to the indium atom to an organic solvent, adding acetylacetone to the mixture and heating the mixture to form a solution, continuing the heating to remove acetylacetone completely, adding a viscosity builder to the solution from which the acetylacetone has been removed, stirring the solution, adding an organic tin compound and stirring the mixture.

DETAILED DESCRIPTION OF THE PREFERRED EMBODIMENTS

Figure 1:
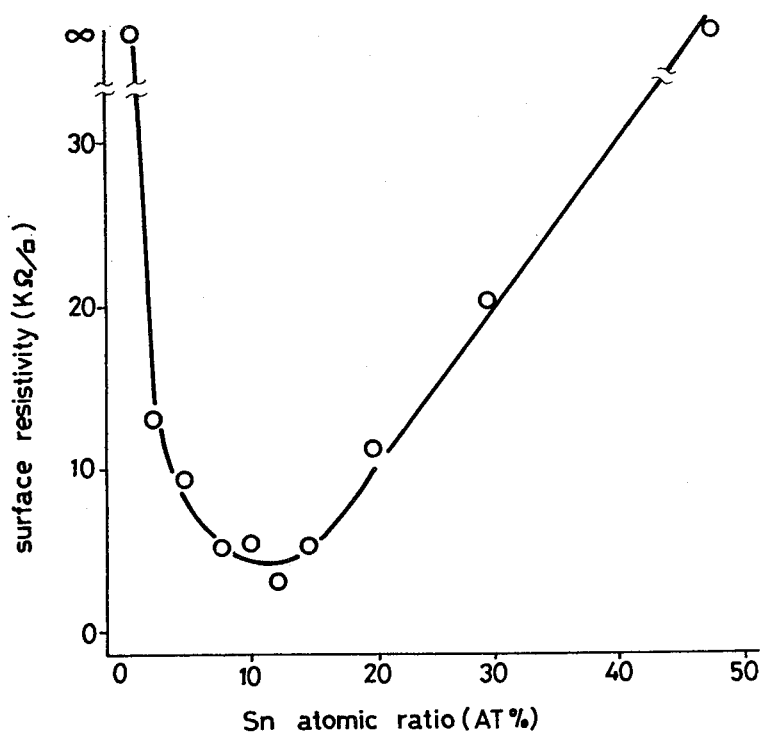
FIG. 1 is a graph showing the results obtained in Example 1 of the present invention.

One of the characteristic features of the present invention is that an organic indium compound is selected and used as a compound capable of forming a metal oxide film by sintering. Organic acid salts of indium having a high inonic bonding property, such as indium octylate $(C_7H_{15}CO_2)_3In$, are mainly used for the conventional pastes of this type. However, organic acid salts of indium are readily hydrolyzed and when pastes are prepared by using these salts, gelation is promoted in the pastes. Since the above-mentioned salts tend to undergo chemical changes such as mentioned above, the shelf life of the resulting pastes is short and the adaptability to the screen printing operation is bad.

In contrast, if an indium complex in which acetylacetone (hereinafter abbreviated to Hacac), a typical instance of the $\beta$-diketone, is coordinated to indium, such as trisacetylacetonatoindium (III) [hereinafter abbreviated to $In(acac)_3$], is selected and used as the indium complex according to the present invention, a paste free from the foregoing defects can be formed. The structures of Hacac and $In(acac)_3$ are as follows.

Hacac: (1)

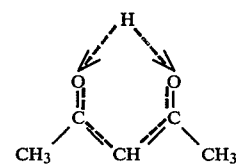

$In(acac)_3$: (2)

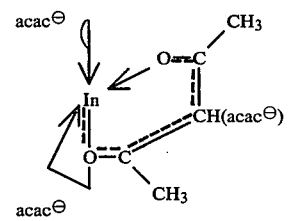

$In(acac)_3$ is thermally decomposed at a temperature higher than 280° C. and is converted at about 500° C. to a metal oxide substantially completely. However, with a film composed solely of indium oxide, it is difficult to reduce the resistivity to a low level, and therefore, the resistivity is ordinarily adjusted by incorporating a minute amount of tin in the formed paste. More specifically, an organic tin compound capable of forming tin oxide by sintering is selected and used. In the present invention, in view of the stability at normal temperatures and the property of being converted at about 500° C. to tin oxide substantially completely, it is preferred that tin octylate, dibutyl tin dilaurate or tetraacetylacetonatotin be used as the organic tin compound. From the results of experiments made by us, it has been found that the stability of the resulting paste is especially enhanced when dibutyl tin laurate or tetraacetylacetonatotin is used in combination with nitrocellulose having a viscosity of 120 seconds as a viscosity builder. In the present invention, it is preferred that the organic tin compound be used in such an amount that the Sn/(In+Sn) atomic ratio is 2 to 20%.

The solvent and viscosity builder used for formation of the paste of the present invention will now be described.

Since the paste of the present invention is applied to a substrate having a low melting point, such as soda glass, the viscosity builder should be thermally decomposable completely at a temperature lower than 500° C. For example, there can be used ethyl cellulose, nitrocellulose, acetyl cellulose and benzyl cellulose. The solvent that is used in the present invention should be inert with respect to the organic indium complex or organic tin compound and should have a good dissolving power for the viscosity builder, a vapor pressure lower than 1 mmHg at normal temperatures and a boiling point of 180° to 350° C. As such solvent, there can be mentioned, for example, high-boiling-point solvents such as 2-ethylhexyl alcohol, benzyl alcohol and terpineol, high-boiling-point esters such as ethyl acetoacetate, benzyl acetate, methyl benzoate, dimethyl phthalate, diethyl phthalate and dibutyl phthalate, high-boiling-point ketones such as acetonylacetone and isophorone, and carbitols such as methyl carbitol, carbitol and carbitol acetate. These solvents may be used singly or in the form of a mixture containing two or more of them.

The process for the preparation of the paste of the present invention will now be described. At first, In(acac)$_3$ is weighed and added to a solvent such as mentioned above, an appropriate amount of Hacac is added, and the mixture is heated at 130° to 180° C. to completely dissolve the indium complex by the action of Hacac. Then, the heating is continued at the above temperature to remove Hacac completely as determined by examining the weight change of the solution. The Hacac-free solution is stable and even if a solvent having a relatively weak dissolving power for In(acac)$_3$ is used. Then, a cellulose compound as the viscosity builder is added to the solution and the mixture is stirred at 50° to 60° C. Finally, an organic tin compound is added and the mixture is stirred, whereby the intended paste is formed. The so-formed paste may be printed in any desired pattern according to the screen printing method, preliminarily dried at 130° to 170° C. and sintered at 400° to 600° C., whereby a transparent coating film having a good electroconductivity is obtained.

The present invention will now be described in detail with reference to the following non-limiting examples.

EXAMPLE 1

A paste comprising In(acac)$_3$, tin octylate, benzyl alcohol, α-4-terpineol and ethyl cellulose A (high molecular weight and high viscosity type) was prepared according to the above-mentioned preparation process. The preliminary drying was carried out at 155° C. for 10 minutes and the sintering was carried out at 510° C. for 30 minutes. These drying and sintering conditions were similarly adopted in the subsequent Examples. The benzyl alcohol/α-4-terpinenol solvent ratio was adjusted 6/4, and while the content of ethyl cellulose A and the total content of the In and Sn compounds were fixed to 9% by weight and 13% by weight, respectively, the In/Sn ratio was changed and the surface resistivity of the coating film was examined. The obtained results are shown in the graph of FIG. 1. As will be seen from FIG. 1, the surface resistivity is reduced to a lowest level when the Sn/(In+Sn) atomic ratio is about 10 to 13%. This value is substantially in agreement with the value of the above atomic ratio at which the surface resistivity of a coating film formed by the chemical spray method or vacuum deposition method is lowest. It also was found that as the tin content is increased, the stability or transparency of the paste is degraded and it is necessary to control the above-mentioned atomic ratio to a level not exceeding 20%. The thickness of the coating film was 2000 to 2500 Å, and the resist thickness of the screen used for printing was 6μ.

EXAMPLE 2

A paste was prepared by using the same compounds as used in Example 1. With the Sn/(In+Sn) ratio, fixed at 12%. Only the content of ethyl cellulose A was changed. The obtained results are shown in Table 1. From the results shown in Table 1, it is seen that in view of the printability, the condition of the coating film and the surface resistivity, it is preferred that the content of ethyl cellulose A be 11 to 12% by weight. As pointed out hereinbefore, ethyl cellulose A is a cellulose derivative of the high molecular weight and high viscosity type. If ethyl cellulose B of the low molecular and low viscosity type is used, in order to obtain a coating film having properties comparable to the properties of the coating film obtained by using ethyl cellulose A in an amount of 11% by weight in the present Example, ethyl cellulose B should be added in an amount of at least 15% by weight.

TABLE 1

| Amount (%) Added of Ethyl Cellulose A | Printability | Transparency | Film Thickness (Å) | Condition of Film | Surface Resistivity (KΩ/□) |
|---|---|---|---|---|---|
| 8 | X | O | 2000 | X (color unevenness) | 0 |
| 9 | Δ | O | 2000 | Δ (color unevenness) | 1.5 |
| 10 | Δ | O | 2000 | O | 1.2 |
| 11 | O | O | 2000 | O | 1.0 |
| 12 | O | O | 2000 | O | 4.0 |
| 14 | X | O | 2000 | Δ (color | * 0 |

TABLE 1-continued

| Amount (%) Added of Ethyl Cellulose A | Printability | Transparency | Film Thickness (Å) | Condition of Film | Surface Resistivity (KΩ/□) |
|---|---|---|---|---|---|
| | | | | unevenness) | |

Note:
O: good,
Δ: slightly bad,
X: bad

From the results obtined in Examples 1 and 2, it is understood that a practical paste composition is as follows:

In(acac)₃: 11.5% by weight,
Tin octylate: 1.5% by weight,
Benzyl alcohol: 45.0% by weight,
α-4-Terpenol: 30.0% by weight,
Ethyl cellulose A: 12.0% by weight.

A paste having the above composition was excellent in the printability, and a transparent film obtained by screen-printing this paste, preliminarily drying the printed paste at 155° C. for 10 minutes and sintering it at 510° C. for 30 minutes had a surface resistivity of b 3 to 4KΩ/□.

EXAMPLE 3

A paste comprising In(acac)₃, nitrocellulose, benzyl acetate, benzyl alcohol, dimethyl phthalate and tin octylate was prepared. The benzyl acetate/benzyl alcohol/dimethyl phthalate solvent ratio was adjusted to 6/2/2. The Sn/(Sn+In) atomic ratio was adjusted to 12% and the total content of the In and Sn compounds was adjusted to 3% by weight, because it was confirmed by the same test procedures as adopted in Example 1 that these atomic ratio and content provided good results. In the present Example, various nitrocelluloses differing in the viscosity were used to examine influences of the viscosity on properties of the paste. The obtained results are shown in Table 2. The drying and sintering conditions and film thickness were the same as in other Examples.

TABLE 2

| Nitrocellulose Compound | | Printa-bility | Stability of Paste | Trans-parency | Condition of Film | Surface Resistivity (KΩ/□) |
|---|---|---|---|---|---|---|
| Viscosity (seconds) | Amount Added (% by weight) | | | | | |
| ¼ | 40 | O | O | O | O | 1.5 |
| ½ | 32 | O | O | O | O | 1.7 |
| 60 | 21 | O | O | O | O | 1.6 |
| 120 | 10 | O | O | O | O | 1.4 |
| 1000 | 7.5 | Δ | X (gelation) | O | X (color unevenness) | 1.9 |

Note:
O: good,
Δ: slightly bad,
X: bad

As is apparent from the results shown in Table 2, with increase of the viscosity of nitrocellulose, the stability of the paste is degraded and the pot life is shortened, and therefore, the printability is reduced, but the surface resistivity is not substantially changed. From the economical viewpoint, it is preferred that the viscosity of nitrocellulose be 120 seconds.

EXAMPLE 4

As illustrated in Example 3, with increase of the viscosity of nitrocellulose, the pot life is shortened and gelation is caused in a short time. From the results of experiments made by us, it was confirmed that these undesirable phenomena are due to tin octylate. We made further researches and found that when dibutyl tin dilaurate or tetraacetylacetonatotin is used as the organic tin compound, the reaction speed such as the gelation speed is drastically reduced. In the present Example, in view of this finding, a paste comprising In(acac)₃, dibutyl tin dilaurate, benzyl acetate, benzyl alcohol, dimethyl phthalate and nitrocellulose having a viscosity of 120 seconds was prepared, and the content of nitrocellulose having a viscosity of 120 seconds was changed to examine the influences of the nitrocellulose content on various properties, while the Sn/(In+Sn) atomic ratio, the total content of the In and Sn compounds and the solvent ratio were the same as in Example 1. The obtained results are shown in Table 3.

TABLE 3

| Amount Added (% by weight) of Nitrocellulose Having Viscosity of 120 Seconds | Printa-bility | Trans-parency | Film Thickness (Å) | Condition of Film | Surface Resistivity (KΩ/□) |
|---|---|---|---|---|---|
| 9 | X | O | 2000 | Δ (color unevenness) | 1.7 |
| 10 | Δ | O | 2000 | Δ (color unevenness) | 1.8 |
| 11 | O | O | 2000 | O | 1.5 |
| 12 | O | O | 2000 | O | 1.5 |
| 13 | O | O | 2000 | O | 1.6 |
| 15 | O | O | 2000 | O | 1.6 |
| 20 | O | O | 2000 | O | 1.6 |

TABLE 3-continued

| Amount Added (% by weight) of Nitrocellulose Having Viscosity of 120 Seconds | Printa- bility | Trans- parency | Film Thickness (Å) | Condition of Film | Surface Resistivity (KΩ/□) |
|---|---|---|---|---|---|
| 30 | X | Δ | 2000–2500 | X | 2.0 |

Note:
O: good,
Δ: slightly bad,
X: bad

As is apparent from the results shown in Table 3, the surface resistivity is not substantially changed even if the amount added of nitrocellulose as the viscosity builder is changed. In this point, nitrocellulose is different from ethyl cellulose used as the viscosity builder in Example 2. In view of the printability and the condition of the coating film, it is preferred that the amount of nitrocellulose added be larger. However, from the economical viewpoint, it is understood that the practical content of nitrocellulose having a viscosity of 120 seconds is 11 to 20% by weight.

EXAMPLE 5

A paste comprising In(acac)₃, dibutyl tin dilaurate, benzyl acetate, benzyl alcohol, dimethyl phthalate and nitrocellulose having a viscosity of 120 seconds was prepared. The Sn/(In+Sn) atomic ratio and the solvent ratio were the same as in Examples 3 and 4. The content of nitrocellulose having a viscosity of 120 seconds was adjusted to 12% by weight while the total content of the In and Sn compounds was changed. The obtained results are shown in Table 4.

TABLE 4

| Total Content (% by weight) of In and Sn Compounds | Resist Thickness (μ) of Screen | Printa- ability | Trans- parency | Film Thickness (μ) | Condition of Film | Surface Resistivity (KΩ/□) |
|---|---|---|---|---|---|---|
| 6 | 6 | O | O | 1000 | O | 5.0 |
| 8 | 6 | O | O | 1500 | O | 2.8 |
| 10 | 6 | O | O | 1800 | O | 2.2 |
| 13 | 6 | O | O | 2000 | O | 1.5 |
| 15 | 6 | O | O | 2500 | O | 1.1 |
| 6 | 12 | O | O | 1700 | O | 2.0 |
| 8 | 12 | O | O | 2000 | O | 1.3 |
| 10 | 12 | O | O | 2500 | Δ | 0.9 |
| 13 | 12 | O | O | 3000 | X | 0.8 |
| 15 | 12 | O | O | 3500 | X | 0.5 |

Note:
O: good,
Δ: slightly bad,
X: bad

From the relation between the total content of the In and Sn compounds and the surface resistivity, shown in Table 4, it will readily be understood that if the resist thickness of the screen or the total content of the In and Sn compounds is changed, a desirable surface resistivity and a desirable film condition can easily be obtained. From the results obtained in Example 3, 4 and 5, it is seen that the practical paste composition is as follows when a screen having a resist thickness of 6μ is used.
In(acac)₃: 10.8% by weight,
Dibutyl tin dilaurate: 2.2% by weight,
Benzyl acetate: 44.4% by weight,
Benzyl alcohol: 14.8% by weight,
Dimethyl phthalate: 14.8% by weight,
Nitrocellulose having viscosity of 120 seconds: 13.0% by weight.

A paste having the above composition is excellent in printability, and when a screen having a resist thickness of 6μ is used, this paste provides a coating film having a good transparency, a thickness of 2000 to 2500 Å and a surface resistivity of 1.2 to 2.0KΩ/□.

EXAMPLE 6

Experiments of Examples 1 through 5 are carried out in the same manner except that tris-8-quinolinolatoindium (III) having an oxygen atom coordinated directly to the indium atom is used instead of trisacetylacetonatoindium (III) [In(acac)₃]. Substantially similar results are obtained.

What is claimed is:

1. A paste for the formation of a transparent electroconductive coating film by screen printing comprising an organic indium complex having an oxygen atom directly coordinated to the indium atom, said complex being capable of forming an indium oxide film by sintering, an organic tin compound capable of forming a tin oxide film by sintering in an amount such that the Sn to (In+Sn) atomic ratio is 2 to 20%, an organic viscosity builder capable of complete thermal decomposition at a temperature lower than 500° C. and selected from the group consisting of ethyl cellulose, nitrocellulose, acetyl cellulose and benzyl cellulose and an inert organic solvent.

2. A paste as in claim 1 wherein the indium complex is trisacetylacetonatoindium (III).

3. A paste as in claim 1 wherein the organic tin compound is tin octylate, dibutyl tin laurate or tetraacetylacetonatin.

4. A paste as in claim 2 wherein the organic tin compound is tin octylate, dibutyl tin laurate or tetraacetylacetonatin.

5. A paste as in claim 1 wherein the organic tin compound is dibutyl tin laurate or tetraacetylacetonatin.

6. A paste as in claim 3 wherein the organic tin compound is dibutyl tin laurate or tetraacetylacetonatin.

7. A paste as in claim 1 wherein the viscosity builder is nitrocellulose having a viscosity of from ¼ to 120 seconds.

8. A paste as in claim 2 wherein the viscosity builder is nitrocellulose having a viscosity of from ¼ to 120 seconds.

9. A paste as in claim 7 wherein the nitrocellulose content is 11 to 20% by weight based on the total weight of the paste.

10. A paste as in claim 8 wherein the nitrocellulose content is 11 to 20% by weight based on the total weight of the paste.

11. A process for the production of a paste for the formation of a transparent electroconductive coating film by screen printing which comprises the steps of:
   1. adding to an inert organic solvent an organic indium complex having an oxygen atom directly coordinated to the indium atom, said complex being capable of forming an indium oxide film by sintering, said organic solvent having a vapor pressure below 1 mm Hg at normal temperatures and a boiling point of 180° C. to 350° C.,
   2. adding acetylacetone,
   3. heating the mixture to dissolve the complex and remove the acetylacetone,
   4. adding a viscosity builder capable of complete thermal composition at a temperature lower than 500° C. and selected from the group consisting of ethyl cellulose, nitrocellulose, acetyl cellulose or benzyl cellulose and
   5. adding and mixing therein an organic tin compound capable of forming a tin oxide film by sintering in an amount such that the Sn to (In+Sn) atomic ratio is 2 to 20%.

12. A method as in claim 11 wherein the viscosity builder is nitrocellulose having a viscosity of from ¼ to 20 seconds.

* * * * *